Figure 1:
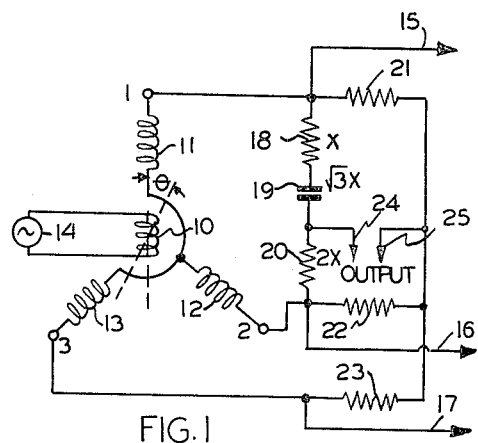

Oct. 12, 1965  H. W. GOLDEN ETAL  3,211,993
SYNCHRO READ-OUT CIRCUIT
Filed Aug. 12, 1963

INVENTORS
HAROLD W. GOLDEN
HARRY J. EDENHOFER

BY *Paris, Haskell & Levine*
ATTORNEYS

United States Patent Office 3,211,993
Patented Oct. 12, 1965

3,211,993
SYNCHRO READ-OUT CIRCUIT
Harold W. Golden, Narberth, and Harry J. Edenhofer, Southampton, Pa., assignors, by mesne assignments, to United Aircraft Corporation, a corporation of Delaware
Filed Aug. 12, 1963, Ser. No. 301,434
5 Claims. (Cl. 323—122)

This invention generally relates to translators for converting angular position to electrical signals having a variable phase angle, and more particularly to such translators for electrically reading out the angular displacement of three winding synchros or selsyns and being useful, among other purposes, for remotely telemetering and recording the angular position of synchros.

In many applications using synchro transmitters and receivers for various communication and control purposes, it is desired to provide an electrical signal indicating the different angular positions of the synchro transmitter in such form that the indication may be easily read out, conveyed to a remotely located indicator, and/or recorded to provide a continual time record of the angular displacements of the synchro. A number of different type mechanical and electric translators have been proposed in the past for providing this function, but many of these are either not sufficiently accurate, or alternatively are unduly complex and hence too expensive for the applications intended.

According to the present invention there is provided a relatively simple and inexpensive electrical network that may be easily electrically interconnected with existing synchro systems and provides an electrical signal having a substantially constant amplitude for all angular positions of the synchro together with a variable phase angle, that varies in direct proportion to the angular displacement between the synchro rotor and stator members over a range encompassing a complete revolution of the synchro rotor. In one preferred embodiment of the invention, the translator is comprised essentially of only five resistors and a single capacitor or inductance and is essentially insensitive to frequency and may be used with different frequency synchro systems operating, for example at 60 cycles, 400 cycles or at other frequencies, by merely changing the value of capacitance or inductance corresponding to that frequency.

It is, accordingly, a principal object of the invention to provide a highly accurate angle-to-phase synchro translator operating over the complete angular displacement of the synchro.

A further object is to provide such a translator producing an electrical signal of varying phase and constant amplitude in direct proportion to the angular displacement of the synchro rotor referenced to the stator.

Another object is to provide such a translator that is considerably less complex and expensive than available devices of comparable accuracy and range.

A still further object is to provide such a translator in the form of an electrical network requiring a minimum number of passive electrical components, and being applicable to different frequency synchro systems.

Still a further object is to provide such a translator that is detachably interconnectable with existing synchro systems without interfering with the system operation.

Figure 2:
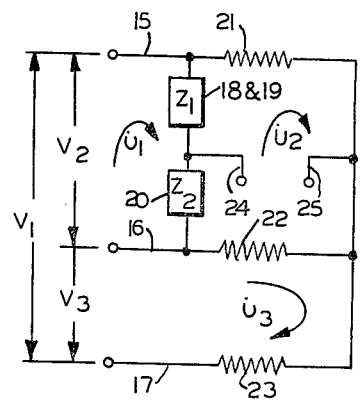
Figure 4:
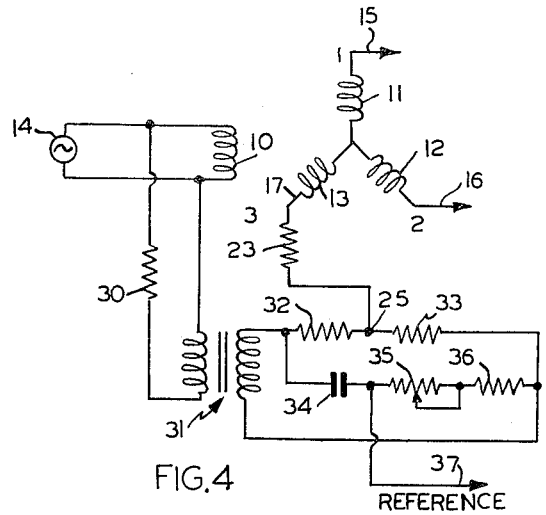
Figure 3:
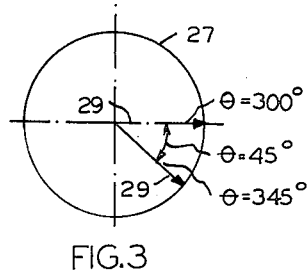
Figure 5:
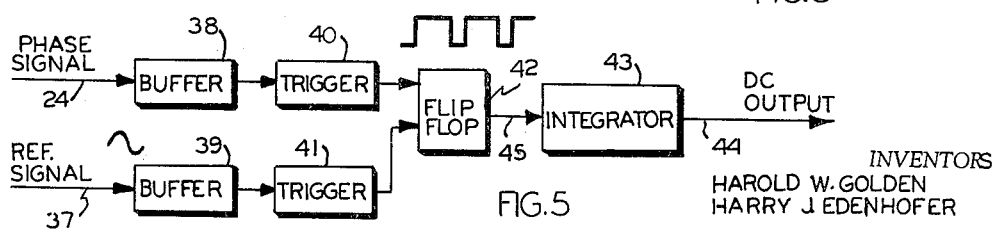

Other objects and many additional advantages will be more readily understood by those skilled in this art after a detailed consideration of the following specification taken with the drawings wherein:

FIG. 1 is an electrical schematic diagram illustrating one preferred embodiment of the invention, FIG. 2 is a modified electrical schematic diagram for assistance in analyzing the circuit of FIG. 1, FIG. 3 is a vector representation of the variable phase and constant amplitude output signal, FIG. 4 is an electrical schematic diagram illustrating a fixed phase shifter for obtaining a phase displaced reference signal, and FIG. 5 is an electrical block diagram illustrating one manner of further converting the phase displaceable signal of constant amplitude into a variable amplitude direct current signal proportional to the angular displacement of the synchro, for such purposes as indication and telemetering.

Referring to the drawings, there is shown in FIG. 1, a three winding synchro of the type whose angular displacement is to be translated according to the invention, and being commonly comprised of a rotor carrying a winding 10 adapted to be energized by an alternating current source 14, and a stator supporting three windings 11, 12, and 13 that are angularly displaced from one another by 120° in space. Such synchros are very commonly used for a myriad of different functions both as transmitters and receivers and it is often required to provide an accurate indication of the relative angular displacement between the rotor and stator members.

In the operation of such synchros, the three stator windings each generally function in the manner of individual transformers with the single rotor winding 10, and produce electrical signals that are either in phase or 180° out of phase with the rotor 10 and having a varying amplitude depending upon the angular displacement between the axis of the rotor 10 and each stator winding.

According to the present invention there is provided a simple network that is interconnectable with these three windings to produce a single phase displaced signal of constant alternating current magnitude and having a variable electrical phase angle in direct proportion to the angular displacement of the rotor 10 with respect to a fixed reference angle on the stator. The circuit produces a proportional phase shift over a complete revolution of the rotor with respect to the stator, and as will be seen this signal may be further converted into a direct current signal of varying amplitude to operate a volt meter or other indicator, or may be otherwise employed to indicate or record the synchro displacement, or may be telemetered to a remote location for such purposes or others.

Returning to FIG. 1, this network preferably comprises in series connection between two stator windings 11 and 12 of the synchro, a first resistance 18, a capacitor 19, and a second resistance 20, together with three equal resistances 21, 22, and 23 arranged in a Y connection with the three synchro windings and providing a common junction at line 25, as shown. It will be appreciated that this network may be interconnected with any existing synchro system by merely coupling the three terminal connections of the network to the three conductors 15, 16, and 17 leading to the three stator windings 11, 12, and 13, without the need for disconnecting the synchro from the remainder of the system (not shown).

To provide the unique characteristics of this network, the resistor 20 has a value of twice that of the resistor 18, and the capacitor 19 is selected to have a reactance equal to $\sqrt{3}$ times that of resistor 18. As will be mathematically shown below, with this network configuration an output signal being taken from between the common junction 25 and the junction 24 between the capacitor 19 and second resistance 20 provides an alternating current signal of constant magnitude and being phase shifted with respect to the source 14 at a variable phase angle in direct proportion to the angular displacement $\theta$ between the synchro rotor 10 and stator. Thus as the synchro rotor 10 is angularly displaced from the stator, a constant magnitude alternating current signal is produced over lines 24 and 25 having a variable electrical phase angle in direct proportion to the angle of displacement $\theta$.

Referring to FIG. 2 for an analysis of this network, it is noted that the network possesses three loops; with current $i_1$ flowing in loop $l$ between conductors 15 and 16 from the synchro, current $i_3$ in the loop between conductors 16 and 17, and current $i_2$ in the inner loop including the resistors 21 and 22 and the impedances $Z_1$, and $Z_2$. In this analysis, the impedance $Z_1$, includes the resistor 18 and capacitor 19, the impedance $Z_2$ comprises the resistor 20, and $Z_T$ is the sum of $Z_1$, plus $Z_2$.

With this circuit arrangement, the voltage and current relationships through the three loops are as follows:

(Loop 1) $V_2 = i_1 Z_T - i_2 Z_T$
(Loop 2) $O = -i_1 Z_T + i_2 (Z_T + 2R) - i_3 R$
(Loop 3) $V_3 = -i_2 R + i_3 2R$ where R is the value of equal resistors 21, 22, or 23.

Solving these three simultaneous equations by conventional methods for the three currents:

$$i_1 = \frac{V_2(2Z_T + 3R) + V_3 Z_T}{3R Z_T}$$

$$i_2 = \frac{V_3 + 2R}{3R}$$

$$i_3 = \frac{2V_3 Z_T + 2RV_3 + V_2 R}{3R^2}$$

The absolute magnitudes of the three sinusoidal voltages from the three windings of the synchro are:

$$|V_1| = A \sin \theta$$
$$|V_2| = A \sin (\theta - 120°)$$
$$|V_3| = A \sin (\theta - 240°)$$

where A is a constant and $\theta$ is the angular displacement of the synchro rotor and stator.

Then substituting these values of voltage into the three current equations, it is noted that:

$$i_2 = \frac{1}{3R}\left[-\frac{3}{2}\sin\theta - \frac{\sqrt{3}}{2}\cos\theta\right]$$

$$i_1 = -\frac{1}{2\sqrt{3}Z_T R}\left[(\sqrt{3}Z_T + \sqrt{3}R)\sin\theta + (Z_T + 3R)\cos\theta\right]$$

The output voltage taken between lines 24 and 25 is therefore:

$$E_{out} = i_2 R + i_2 Z_1 - i_1 Z_1 = i_2 R + Z_1(i_2 - i_1)$$

and substituting the values of $i_1$ and $i_2$ in this equation and simplifying, the output voltage, E output is:

$$E_{out} = \frac{1}{2\sqrt{3}}\left[-\sqrt{3}\sin\theta - \cos\theta + \frac{Z_1\sqrt{3}}{Z_T}\sin\theta + \frac{3Z_1}{Z_T}\cos\theta\right]$$

From the immediately above equation it is noted that the absolute value of the output voltage is proportional to the sine and cosine functions of the synchro angular displacement $\theta$ as well as the impedances $Z_1$, and $Z_2$, but is independent of resistors 21, 22, or 23.

Since
$$Z_1 = X - j\sqrt{3}X$$
$$Z_2 = 2X$$
$$ZT = Z_1 + Z_2 = 3X - j\sqrt{3}_x$$

Then substituting these fixed preselected values of $Z_1$, and $Z_T$ into the equation for the output voltage, then:

$$E_{ous} = \frac{1}{2\sqrt{3}}[\cos(\theta - 300°) - j\sin(\theta - 300°)]$$

From this above equation it is seen that the absolute value of the output voltage is comprised of a real term (cosine) and an imaginary term (sine) both of which vary in proportion to the synchro angular displacement $\theta$, and by vector plotting the variation of E output with changes in angle $\theta$, as shown in FIGURE 3, it is noted that the vector sum of these cosine and sine functions is a constant magnitude vector 29 that is the same in amplitude for all angles $\theta$, but is varied in phase angle in direct proportion to the relative angular displacement of the synchro rotor and stator.

Adding the conventional sinusoidal component term $wt$, this output voltage can then be restated as:

$$E_{out} = K \sin(wt - \theta)$$

where K is a constant and where $wt$ is the conventional sinusoidal variation proportional to the frequency of the source 14.

Thus, this last equation shows that at the output of this network, across lines 24 and 25, there is provided a constant magnitude sinusoidal signal of the same frequency as the source 14 for all rotative positions of the synchro rotor, but being variably shifted in phase with respect to the source 14 in direct proportion to the relative angular displacement between the synchro rotor and stator.

It will be noted that the absolute values of the resistors 18 and 20 and the capacitor 19 are not critical in the proper functioning of the network so long as the interrelationship of these elements is such that the resistor 20 is twice as large as resistor 18 and the reactance of capacitor 19 is greater than resistor 18 by a factor of $\sqrt{3}$. It is further noted that the values of the balancing resistors 21, 22, and 23 are unrelated to the values of resistor 18, and the only requirement for these resistors 21, 22, and 23 is that they all be of equal value.

The network is also frequency insensitive except for the capacitor 19, and consequently may be employed with synchro systems of different frequency, e.g., 60 cycles, 400 cycles, etc., by merely changing or varying the capacitor 19 such that its reactance at the synchro frequency is greater than resistor 18 by the factor of $\sqrt{3}$. Thus to provide a universal translator network that is useful at all different synchro frequencies, the network may be provided with an adjustable capacitor 19 (not shown) or with a series of different value capacitors that may be selectively switched into the network (not shown).

As is also shown by the above equations, an inductance (not shown) may be substituted for the capacitor 19 with the same result; providing that its reactance at the synchro frequency exceeds that of resistor 18 by the factor of the $\sqrt{3}$.

It will be noted from the equation of the output voltage that the phase shift angle of the output signal is not the deviation angle $\theta$ alone but is modified by a fixed angle of 300°; e.g. ($\theta - 300°$). This presents no problem in the network since it is merely necessary to introduce a fixed phase shift of 300° into the reference signal from source 14, as shown in FIG. 4. Referring to FIG. 4, to obtain this fixed phase shifted reference signal, a simple phase shifting network is provided and is energized by source 14 through a series resistor 30 and a transformer 31. This fixed phase shift network may comprise a simple parallel circuit including in one leg a pair of resistors 32 and 33, and in the other leg, a capacitor 34 and a pair of resistors 35 and 36. A fixed 300° phase shifted signal is obtained from the junction of capacitor 34 and resistor 35, and is referenced to the same base 25 as is the output signal from the network of FIG. 1, by connecting the junction of resistors 32 and 33 to the common junction line 25 of FIG. 1. It is believed apparent to those skilled in the art that many other known fixed phase shifters may be substituted for the circuit of FIG. 4 with the same result.

FIG. 5 illustrates one manner of converting the variable phase output signal obtained from the circuit of FIG. 1, into a varying amplitude direct current signal, whose amplitude is directly proportional to the synchro angle $\theta$.

As shown, the variable phase output signal from FIG. 1 over line 24 and the fixed phase reference signal over line 37 (from FIG. 4) are each separately directed into buffer amplifiers 38 and 39, respectively, and thence each is conveyed to different trigger circuits 40 and 41, as shown. The trigger circuits 40 and 41, are each of conventional configuration, such as known Schmitt triggers, and function by producing fixed duration pulses when triggered by an incoming signal of given amplitude. Since the phase signal over line 24 is time displaced from the reference signal over line 37 by a phase angle $\theta$ proportional to the synchro angular displacement, the two trigger circuits likewise produce phase displaced pulses separated by the same time or electrical angle $\theta$. One of the triggers 40 energizes one input of a flip-flop circuit 42 to one condition of polarity, and the other trigger circuit 41 restores the flip-flop to its initial condition. Consequently at the flip-flop output line 45, there is provided pulses of variable time duration, or variable pulse width, in direct proportion to the phase angle $\theta$ and hence in direct proportion to the synchro angular displacement. These variable width pulses are then directed to an integrator circuit 43, where they are integrated to provide a direct current signal output over line 44 having a variable amplitude that is directly proportional to the duration or width of the flip-flop pulses, and in turn directly proportional to the angular deviation $\theta$ of the synchro rotor referenced to the stator. For a direct indication of the angular displacement $\theta$, this variable amplitude direct current output signal over line 44 may be applied to energize an indicator such as a voltmeter (not shown) having a calibrated scale in terms of angle $\theta$ rather than voltage, or alternatively the signal on line 44 may be recorded or detected by a conventional telemetry system and transmitted to a remote location.

Although but one preferred embodiment of the invention has been illustrated and described it will be evident that many changes may be made by those skilled in the art without departing from the spirit and scope of this invention. For example it will be evident that the preferred network may employ active components, such as reactance tube or transistor circuits instead of an inductor or capacitor 19. Similarly, the equal valued resistors 21, 22, and 23 may be replaced by other equal valued impedances. As noted above, the reference phase shifter circuit may be replaced by other known phase shifting means, and the phase to amplitude conversion circuit of FIG. 5 may likewise be replaced by other known converters for providing the same function of converting the phase shift $\theta$ into other detectable forms. Since these and many other changes may be made, this invention is to be considered as being limited only by the following claims appended hereto.

What is claimed is:

1. An angular displacement to phase translator network for synchros having a three winding stator comprising: an equal value balancing impedance for connection to each output line of the synchro, with all said impedances being interconnected to provide a common junction, a network impedance comprising in series connection a first resistance, a reactance, and a second resistance, with said network impedance being connectable between two of the three stator output lines of the synchro, said second resistance having a value of twice that of the first resistance and said reactance having a value equal to the product of $\sqrt{3}$ times the value of the first resistance, and output means connected between said common junction and the junction of said reactance and second resistance for obtaining a constant amplitude signal having a variable phase angle in proportion to the angular displacement between the synchro rotor and stator.

2. A translator network for synchros having a stator and rotor member with one of said members having three angularly displaced windings in space, said network being interconnectable with the terminals of said three windings to provide a constant amplitude signal having a variable electrical phase in proportion to the angular displacement between the synchro stator and rotor windings comprising: a series circuit connectable between the terminals of two of the three windings and comprising in series sequence a first resistor, a reactance, and a second resistor; said second resistor having a value of twice that of the first resistor and said reactance having a value between said first and second resistors, three balancing resistors being interconnected to provide a common junction and being interconnectable with the terminals of the three windings of the synchro to equally load the three windings, and output means for said network for deriving said signal from said common junction to the junction interconnecting the second resistor and the reactance.

3. In the network of claim 2, said reactance comprising a capacitor.

4. A passive network for translating the angular displacement of a three winding synchro into a constant amplitude signal of variable electrical phase in proportion to said angular displacement comprising: a passive circuit consisting of a first and second impedance interconnected in series between two terminals of the three windings of the synchro, the first impedance having a resistance and a reactance, with the reactance being greater than the resistance by a factor of $\sqrt{3}$, and the second impedance having a resistance that is about twice the resistance of the first impedance, a balancing circuit comprising three equal valued impedances being interconnectable between all three terminals of the three synchro windings and providing a common junction, and output signal means being connected between said common junction and the junction of the first and second impedances.

5. A translation network for a three winding synchro to provide a phase displaced electrical signal proportional to the angular displacement between the stator and rotor of the synchro comprising: a first resistance, a capacitor, and a second resistance being interconnected in series and being interconnectable between two of the three windings of the synchro, the second resistance having a value of twice the first resistance and the capacitor having a reactance greater than the first resistance by a factor of $\sqrt{3}$, a balancing network comprising three equal valued resistors interconnectable in Y configuration with the three windings of the synchro to provide a common junction and output means for producing said variable phase electrical signal between said common junction and the series connection between said capacitor and second resistance.

References Cited by the Examiner

UNITED STATES PATENTS

| 1,951,026 | 3/34 | Levine | 323—122 |
| 2,736,851 | 2/56 | Dutilh | 323—109 |

FOREIGN PATENTS

| 650,137 | 2/51 | Great Britain. |

LLOYD McCOLLUM, *Primary Examiner.*